United States Patent
Peters et al.

(10) Patent No.: US 7,430,850 B2
(45) Date of Patent: Oct. 7, 2008

(54) BIFURCATED OIL SCAVENGING BEARING COMPARTMENT WITHIN A GAS TURBINE ENGINE

(75) Inventors: Robert E. Peters, Portland, CT (US); Dwayne Messerschmidt, Columbia, CT (US); J. Axel Glahn, Manchester, CT (US); Kenneth L. Allard, Wilbraham, MA (US); Hslanmin F. Jen, Woodbridge, CT (US); Larry W. Spires, Unionville, CT (US); Roger M. Barnsby, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 353 days.

(21) Appl. No.: 11/257,940

(22) Filed: Oct. 25, 2005

(65) Prior Publication Data

US 2006/0037302 A1 Feb. 23, 2006

Related U.S. Application Data

(62) Division of application No. 10/738,354, filed on Dec. 17, 2003, now Pat. No. 6,996,968.

(51) Int. Cl.
*F02C 7/06* (2006.01)
(52) U.S. Cl. .................. 60/39.08; 184/6.11
(58) Field of Classification Search ............ 60/39.08; 184/6.11; 415/88, 89, 175
See application file for complete search history.

(56) References Cited

U.S. PATENT DOCUMENTS

| 3,532,443 | A | * | 10/1970 | Johnson | 60/39.08 |
| 4,570,947 | A | * | 2/1986 | Smith | 277/428 |
| 5,107,676 | A | * | 4/1992 | Hadaway et al. | 60/39.08 |

* cited by examiner

*Primary Examiner*—Louis J Casaregola
(74) *Attorney, Agent, or Firm*—Carlson, Gaskey & Olds

(57) ABSTRACT

An oil scavenge system includes a tangential scavenge scoop and a settling area adjacent thereto which separately communicate with a duct which feeds oil into an oil flow path and back to an oil sump. A shield is mounted over the settling area to at least partially shield the collecting liquid oil from interfacial shear. A multiple of apertures are located through the shield to permit oil flow through the shield and into the duct. The scavenge scoop forms a partition which separates the duct into a first portion and a second portion. The first portion processes upstream air/oil mixture that is captured by the tangential scoop while the second portion receives the oil collected in the settling area.

3 Claims, 4 Drawing Sheets

BIFURCATED OIL SCAVENGING BEARING COMPARTMENT WITHIN A GAS TURBINE ENGINE

The present invention is a divisional application of U.S. patent application Ser. No. 10/738,354, filed Dec. 17, 2003 now U.S. Pat. No. 6,996,968.

BACKGROUND OF THE INVENTION

The present invention relates to oil systems for gas turbine engines, and more particularly to an oil scavenge system.

Gas turbine engines employ high-speed bearings that require a continuous supply of oil for lubrication and cooling. For optimum performance, the oil flow must be properly directed into and away from the bearings. Failing to remove or scavenge oil from the bearing may be as detrimental to the bearing as insufficient oil flow because the churning of unscavenged oil within the bearing can rapidly lead to overheating.

In a conventional lubrication system, oil is supplied to the rolling elements of the bearings under pressure and then relies on gravity or its dynamics to drain back to a reservoir. One effective way to accomplish the return flow is to maintain an open, straight, and unrestricted passageway from the bearing back to the sump. This often requires that the air/oil mixture be redirected from a circumferential path within the bearing to an exit pipe, which is arranged axially or radially thereto.

To redirect the swirling bearing compartment two-phase air/oil mixture from the circumferential path direction to the axial or radial exit pipe flow direction, current oil scavenge systems use tangential scoops that transition into an integrated 90 deg bend that connects to the exit pipe. Due to minimum length requirements for the 90 deg bend, conventional scavenge ports may have an inlet plane located several degrees upstream of bottom dead center (BDC). Oil provided to the bearing compartment cavity downstream of the inlet plane needs to be carried by interfacial shear forces around the compartment to reach the inlet plane. Otherwise the oil may begin to collect in the cavity. The former typically occurs at high power settings while the latter typically occurs at low power settings such as motoring, windmilling, or idle. To permit drainage of collected oil that has not been captured by the tangential scoop, a drain is typically integrated into the tangential scoop/bend arrangement at BDC.

Although effective for particular compartment sump dimensions and moderate rotational speeds, as engine core size constraints become more aggressive and speeds increase, disadvantages of conventional scavenge port arrangements may begin to occur. In particular, as the size of the sump region decreases, the distance between the compartment seals and the free surface of the collected oil pool decreases. The reduced separation may increase the potential for oil leakage. Furthermore, interfacial shear acting on the gas/liquid interface may drive oil away from the drain at BDC. The oil may then form a recirculation zone downstream at BDC. Oil recirculation zones tend to contaminate seals, which may ultimately result in oil leakage from the compartment.

Accordingly, it is desirable to provide an oil scavenge system which efficiently directs a two-phase air/oil mixture with high circumferential flow velocity and significant velocity differences between both media into an axial or radial flow direction within compact high speed bearing compartments without oil leakage and at all operating conditions.

SUMMARY OF THE INVENTION

The oil scavenge system according to the present invention provides a tangential scavenge scoop and a settling area adjacent thereto which separately communicate with a duct which feeds oil into an oil flow path and back to an oil sump. The settling area is downstream of the scavenge scoop relative to a rotational direction defined about the axis of rotation of the engine.

A shield is mounted over the settling area to shield the collecting liquid oil from interfacial shear. A multiple of apertures are located through the shield to permit oil flow through the shield and into the duct.

The scavenge scoop forms a partition which separates the duct into a first portion and a second portion. The duct is located at bottom dead center of the housing and the partition generally bisects the duct but may alternatively be biased in a particular direction. The first portion is sufficient to process the upstream air/oil mixture that is captured by the tangential scoop while the second portion receives the oil collected in the settling area.

The present invention therefore provides an oil scavenge system which efficiently directs a two-phase air/oil mixture with high circumferential flow velocity and significant velocity differences between both media into an axial or radial flow direction within compact high speed bearing compartments without oil leakage and at all operating conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
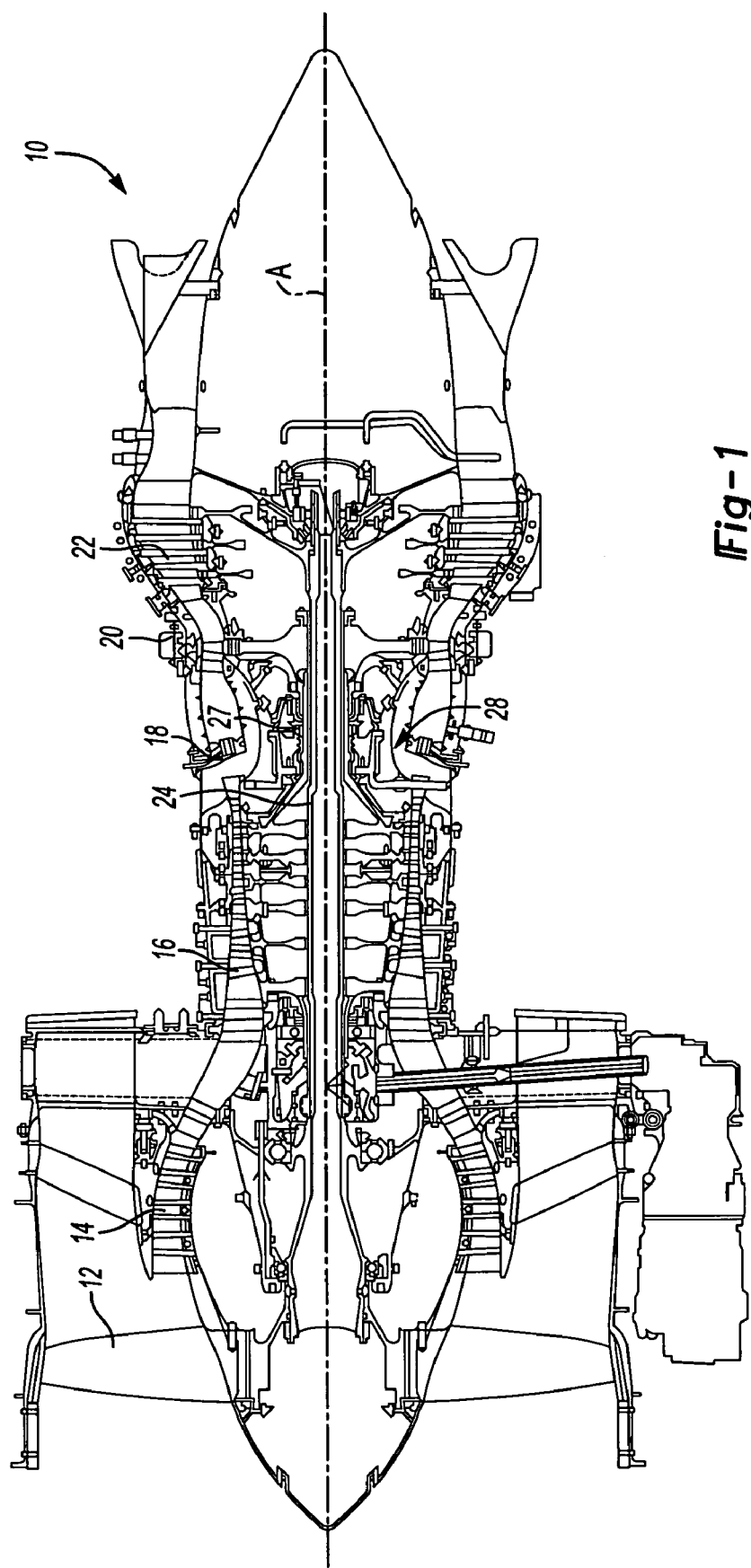
FIG. 1 is a general schematic sectional view of an exemplary gas turbine engine embodiment for use with the present invention.

FIG. 1 illustrates a general schematic sectional view of a gas turbine engine 10. The gas turbine engine 10 is defined about an engine centerline A about which the various engine sections rotate. Generally, the engine 10 includes a fan section 12, a low pressure compressor section 14, a high pressure compressor section 16, a combustor section 18, a high pressure turbine section 20 and a low pressure turbine section 22. It should be understood that although a particular arrangement is disclosed in the illustrated embodiment, other arrangements will benefit from the instant invention.

Figure 2:
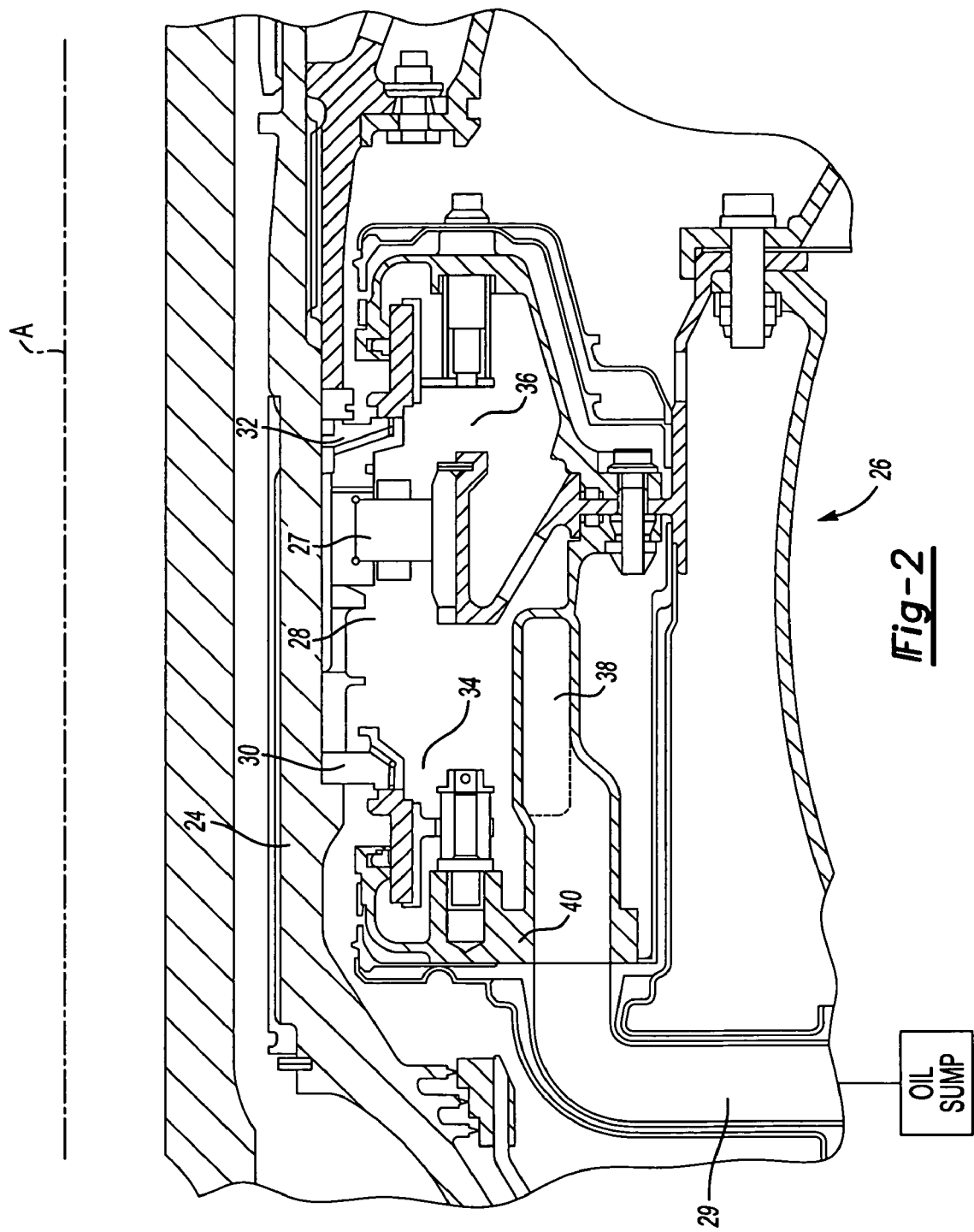
FIG. 2 is a general schematic sectional view of a mid bearing compartment illustrated in FIG. 1.

The sections are mounted about a main shaft 24 supported by various high-speed bearings. One bearing 27 is located within a mid bearing compartment 28. The bearing 27 and compartment 28 receives lubrication and cooling from oil which is provided through jets and is then collected through an oil scavenge system which returns the oil to an oil sump through a flow path 29 (FIG. 2). It should be understood that various bearing systems will benefit from the present invention.

Referring to FIG. 2, the mid bearing compartment 28 seals 30, 32 prevent oil leakage from a compartment front 34 and a compartment rear 36. Air and oil flows mix inside the bearing compartment 28 and generate a flow pattern about the engine axis of rotation A. The oil flow pattern generally operates as follows: Oil particles coalesce along the internal bearing compartment partitions and form a liquid partition film which contains air bubbles. In the radial space between the rotating main shaft 24 and the liquid oil film, a mixture of air and dispersed oil particles swirl in a circumferential direction at a velocity greater than the liquid oil film flow along the compartment partitions. As a result, the oil film flow is exposed to high shear stresses at the air/oil film interface. Film thickness and velocity distributions inside the bearing compartment 28 are driven by the magnitude of that interfacial shear and superimposed effects of gravitational forces.

To achieve compartment functionality, i.e. low temperatures and low heat generation without risk of oil leakage, air and oil flows are discharged to an oil scavenge system 38 which communicates with the oil sump through the flow path 29. It should be understood that various conventional oil injection jets and breather systems may be utilized with the present invention.

Figure 3:
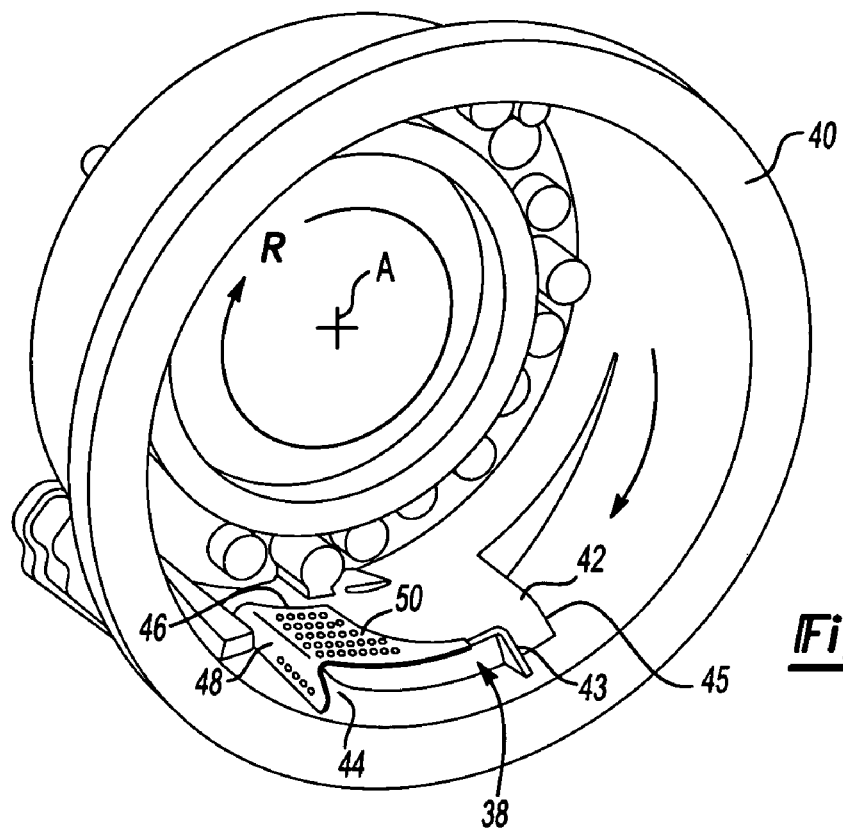
FIG. 3 is a rear expanded perspective view of a housing portion with an oil scavenge system of the present invention.

Referring to FIG. 3, the oil scavenge system 38 is formed within a housing 40 which forms a portion of the mid bearing compartment 28 (FIG. 2). It should be understood that although a cylindrical housing is disclosed in the illustrated embodiment, various housing configurations which utilize oil scavenge system will benefit from the present invention.

Figure 4:
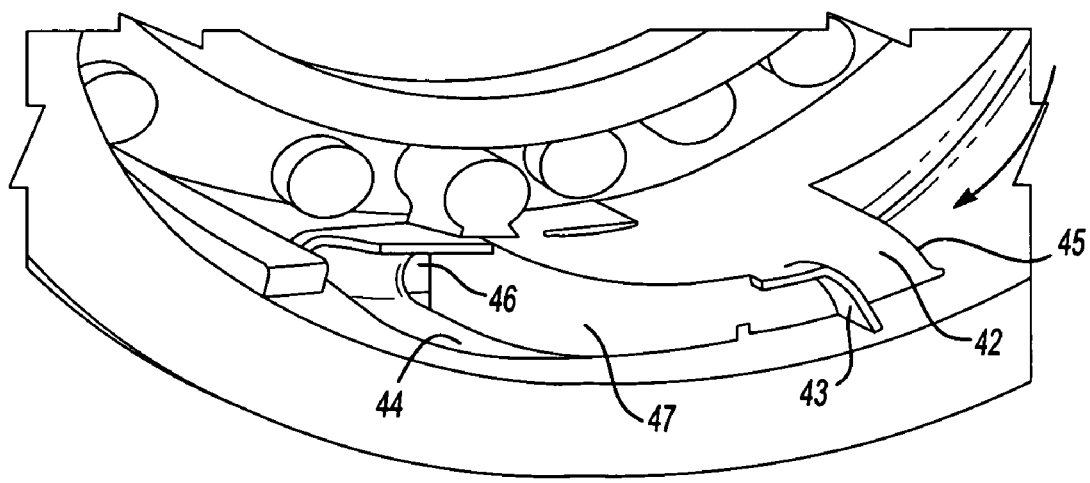
FIG. 4 is a rear expanded perspective view of the housing portion without a shield component illustrated in FIG. 3.

The oil scavenge system 38 generally includes a scavenge scoop 42 and a settling area 44 adjacent thereto. The scavenge scoop 42 defines a scavenger scoop intake 45 directed in a circumferential direction relative a rotational direction defined about said axis of rotation to collect air and oil flows which swirl in a circumferential direction about said axis of rotation. The scavenge scoop 42 and the settling area 44 separately communicate with a duct 46 (also illustrated in FIG. 4) which feeds oil into the flow path 29. Preferably, the settling area 44 is downstream of the scavenge scoop 42 relative a rotational direction R defined about the axis or rotation A. That is, the settling area 44 is opposite the scavenge scoop 42 (FIG. 4) to collect oil that is in more of a liquid form. Various baffles 43 or the like may additionally extend from the scoop 42 to assist in direction of the oil mixture.

Preferably, a shield 48 is mounted over the settling area 44 to at least partially shield the collecting liquid oil from interfacial shear. A multiple of apertures 50 are located through the shield 48 to permit oil flow through the shield 48 and into the duct 46. It should be understood that the shield 48 alternatively be cast directly into the housing.

Figure 5:
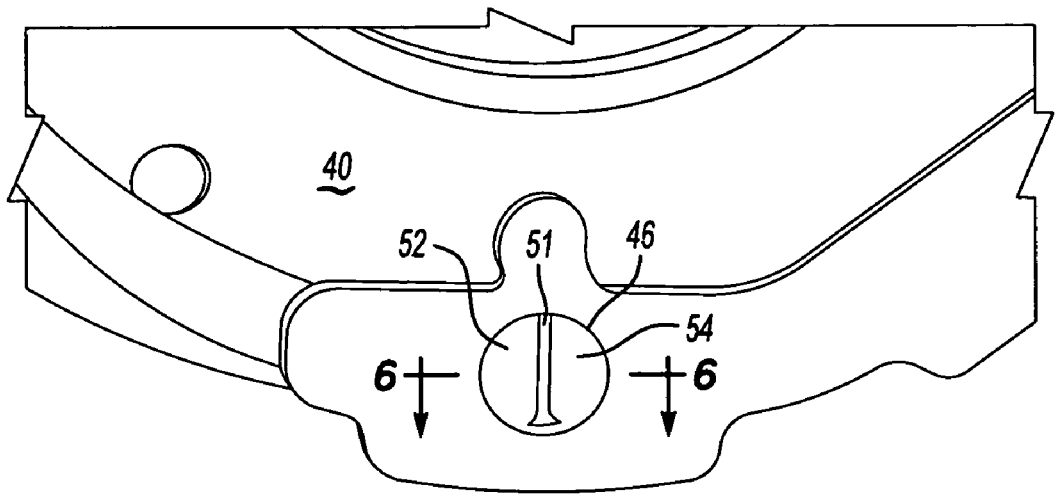
FIG. 5 is a front expanded perspective view of a housing portion with an oil scavenge system of the present invention.
Figure 6:
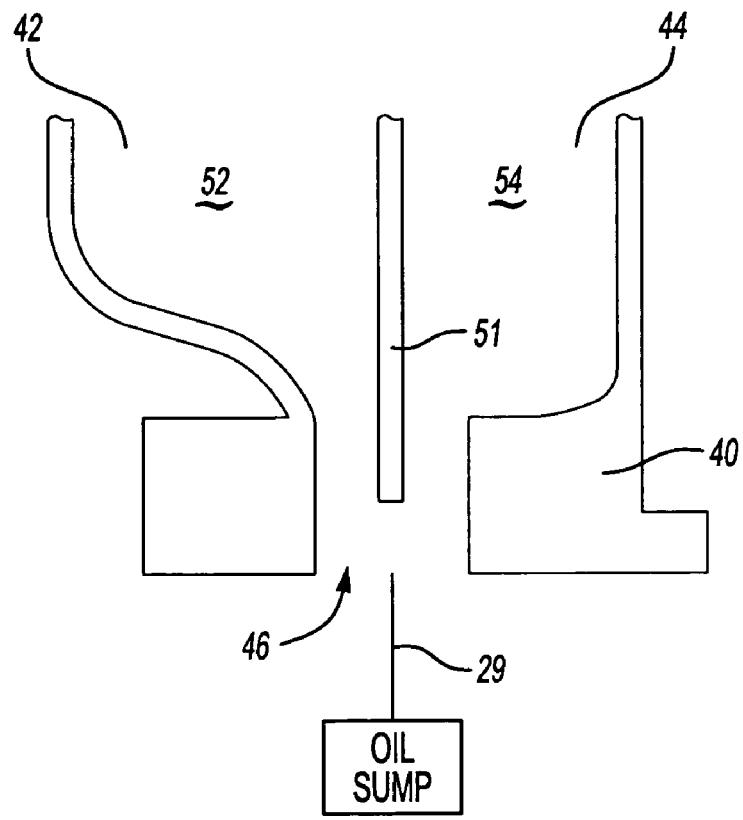
FIG. 6 is a sectional view of an oil duct from the oil scavenges system taken along line 6-6 in FIG. 5.

Referring to FIG. 5, the scavenge scoop 42 forms a partition 51 which separates the duct 46 into a first portion 52 and a second portion 54 (also illustrated FIG. 6). Preferably, a downstream wall 47 of the scavenger scoop 42 forms the partition 51 (also illustrated in FIG. 4). Preferably, the duct 46 is located at bottom dead center (BDC) of the housing 40 and the partition 51 generally bisects the duct 46. The partition 51 may alternatively be biased in a particular direction so in response to flow conditions of the expected two-phase air/oil mixture to provide efficient operation with low residence time and without recirculation zones and hot spots.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
    a bearing housing within a mid bearing compartment of a gas turbine engine, said bearing housing defined about an axis of rotation and including a duct, said axis of rotation defined along a centerline of said gas turbine engine;
    a scavenge scoop within said bearing housing which includes an intake generally directed in a circumferential direction relative a rotational direction defined about said axis of rotation, said scavenge scoop in communication with a first portion of said duct, said scavenge scoop defining a partition which separates said duct into said first portion and a second portion.

2. The bearing compartment as recited in claim 1, furthering comprising a settling area within said bearing housing adjacent said scavenge scoop, said settling area in communication with said second portion of said duct opposite said partition.

3. A bearing compartment comprising:
    a bearing housing defined about an axis of rotation, said housing defining a duct said bearing housing located within a mid bearing compartment of a gas turbine engine, said axis of rotation defined along a centerline of said gas turbine engine;
    a scavenge scoop within said bearing housing which includes an intake generally directed in a circumferential direction relative a rotational direction defined about said axis of rotation, said scavenge scoop in communication with a first portion of said duct, said scavenge scoop defining a partition which separates said duct into said first portion and a second portion; and
    a settling area within said housing adjacent said scavenge scoop, said settling area in communication with said second portion of said duct opposite said partition.

* * * * *

UNITED STATES PATENT AND TRADEMARK OFFICE
CERTIFICATE OF CORRECTION

PATENT NO. : 7,430,850 B2  Page 1 of 1
APPLICATION NO. : 11/257940
DATED : October 7, 2008
INVENTOR(S) : Peters et al.

It is certified that error appears in the above-identified patent and that said Letters Patent is hereby corrected as shown below:

ON THE TITLE PAGE:
Item [75] 5th Inventor should read as follows: --Hsianmin F. Jen, Woodbridge, CT (US)--

Signed and Sealed this

Twenty-fifth Day of November, 2008

JON W. DUDAS
*Director of the United States Patent and Trademark Office*